Figure 1:
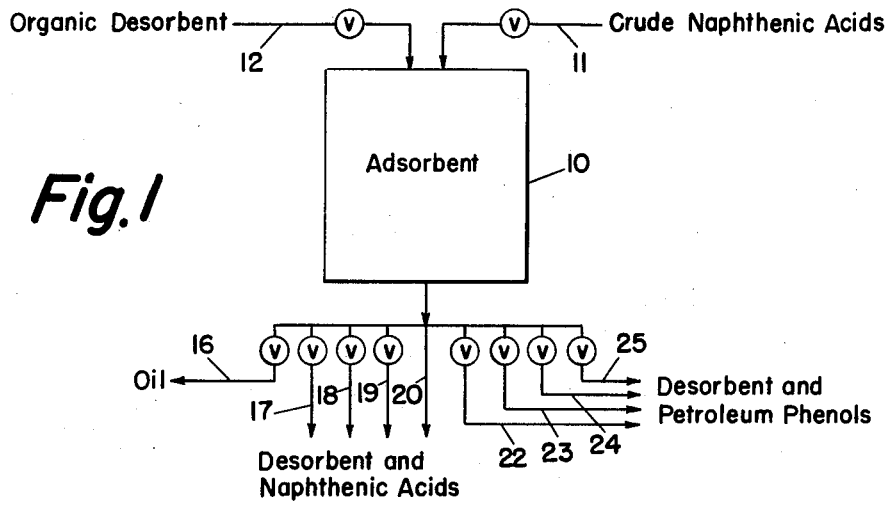

Nov. 8, 1955     I. W. MILLS     2,723,289

TREATMENT OF NAPHTHENIC ACIDS

Filed March 27, 1953

INVENTOR.
IVOR W. MILLS

BY Robert O. Spindle

ATTORNEY

United States Patent Office 2,723,289
Patented Nov. 8, 1955

2,723,289

TREATMENT OF NAPHTHENIC ACIDS

Ivor W. Mills, Glenolden, Pa., assignor to Sun Oil Company, Philadelphia, Pa., a corporation of New Jersey Application March 27, 1953, Serial No. 346,218

8 Claims. (Cl. 260—514)

This invention relates to the treatment of petroleum naphthenic acids to obtain a plurality of fractions thereof having different chemical structure.

The invention involves in one embodiment separation of naphthenic acids from other petroleum constituents such as petroleum "phenols"; in another embodiment it involves separation of naphthenic acids into various fractions having different properties, some of which fractions are better suited for certain uses of naphthenic acids than are other fractions. Simultaneous fractionation and separation from other petroleum constituents may be effected.

According to the present invention, crude naphthenic acids are contacted with an adsorbent material to adsorb naphthenic acids thereon, and subsequently the adsorbent is contacted with an organic solvent desorbing agent, and desorbate fractions having varying composition are recovered, the earlier desorbate fractions containing the less strongly adsorbed constituents of the original charge material, and the later desorbate fractions containing the more strongly adsorbed materials.

It has been found that operation in the manner described is capable of producing, from a petroleum material containing naphthenic acids and petroleum phenols and also unsaponifiable oil, a division of the petroleum material into the above three generic component parts, and also if desired a subdivision of one or more of the main divisions into separate fractions having varying composition and properties. For example, as a specific instance, ten product fractions may be obtained, one of which is an unsaponifiable oil fraction, five of which are naphthenic acid fractions having varying properties, and four of which are phenol fractions having varying properties. These numbers are merely illustrative, as any desired number of the various kinds of fractions may be obtained.

The process of the present invention may be carried out with any suitable method of contacting adsorbent with the petroleum charge and subsequently with the desorbing agent. The adsorbent may be employed in a stationary bed and contacted successively with the charge and desorbing agent. Thus, the charge may be introduced to the top of the bed and allowed to percolate thereinto until the desired amount has been introduced; then, the introduction of charge may be interrupted and the introduction of desorbent to the top of the bed begun. When the first effluent fraction has been collected, the flow of effluent may be diverted to a second receiver and a second fraction collected. This procedure may be continued, collecting as many different fractions as may be desired. By distillation of solvent from the various fractions, the latter may be obtained as solvent-free fractions of naphthenic acids, phenols, or oil.

An alternative operation may involve transportation of the adsorbent through a plurality of zones, one zone being for example an adsorption zone wherein the adsorbent is contacted with the charge material, and the other zones being desorption zones in each of which the adsorbent is successively contacted with a separate amount of desorbing agent to obtain a plurality of desorbate fractions, from which solvent-free fractions can be obtained as described above.

The separation of naphthenic acids into various fractions, according to one embodiment of the present invention, is effected on the basis of varying adsorbability on the adsorbent involved. Various properties, such as refractive index, specific gravity, bromine number, and saponification number vary from fraction to fraction. For example, in some instances the fractions containing less strongly adsorbed naphthenic acids have generally lower refractive index and bromine number than the more strongly absorbed acids, but this is not necessarily true in all cases.

In some instances, no appreciable difference has been found in boiling range between fractions having varying adsorbabilities, the indication being that the separation is not on the basis of molecular weight. In other instances, a separation on the basis of molecular weight may be obtained, e. g. in cases where the lower molecular weight acids are more strongly adsorbed. The actual structural factors determining relative adsorbability are not known, but it is clear that a novel separation according to type is accomplished by the process of the present invention.

It has further been found that the method of the present invention is capable of providing a division of naphthenic acids into a plurality of fractions some of which are more suitable than others for use, in the form of alkali metal naphthenates, as emulsifying agents in the emulsion polymerization of butadiene compounds. In some instances at least, the less strongly adsorbed naphthenic acids provide the better emulsifiers for such emulsion polymerization, and soaps of a fraction of less strongly adsorbed naphthenic acids often provide much more rapid polymerization of butadiene and styrene, for example, than is provided by soaps of a fraction of more strongly adsorbed acids.

The organic solvent desorbing agent which is used according to the present invention, for desorption of materials from the adsorbent, should have substantial miscibility with the petroleum material involved. It is advantageous in some instances at least to employ, in a percolation process as desorbing agent, a mixture of two or more desorbent materials, one of which has a high degree of adsorbability on the adsorbent and consequently has a strong desorbing action, and the other of which has a lower degree of adsorbability and consequently has an advantageous fractionating action as it passes through the adsorbent. For example, ethanol as strong desorbent and pentane as fractionating desorbent may advantageously be used in admixture as a desorbing agent, the ethanol tending to remain in the upper portion of the adsorbent column because of its high adsorbability, and pentane tending to flow through and out of the column at the lower end thereof because of its low adsorbability; the pentane serves to fractionate the material displaced from the adsorbent by the ethanol and to carry along with it the less strongly adsorbed constituents of the displaced material.

Desorbing agents may be characterized as to their adsorbability on the adsorbent by means of their adsorption index for the adsorbent used. Adsorption index of a material is here defined as the apparent number of cubic centimeters of the material adsorbed by one kilogram of the adsorbent when the latter is in equilibrium with a solution consisting of 0.2% of the material and 99.8% of isooctane. A detailed description of determination of adsorption index is found in Hirschler et. al. Patent 2,441,572. The adsorption index represents the amount of the material adsorbed from a standard liquid at a standard concentration and therefore a measure of the affinity of the particular adsorbent for the material. A low adsorption index indicates a weakly adsorbable compound while a high adsorption index indicates one that is strongly adsorbable. A list of adsorption indexes for various organic solvents on silica gel is given in Olsen Patent 2,585,490.

The desorbing agent used according to the present invention should contain a substantial amount of a material having an adsorption index for the adsorbent used within the approximate range from 0 to 50. Where a mixture of plural desorbents is used, at least one of them should have such adsorption index within the approximate range from 0 to 50. Particularly advantageous results are obtained where a mixture of desorbents is used, one being a fractionating desorbent having adsorption index within the approximate range from 0 to 50, and another being a strong desorbent having adsorption index greater than 50, and preferably within the approximate range from 100 to 300.

It is noted that fractionating desorbents, i. e., desorbents having adsorption index within the range from 0 to 50 may be used either or in admixture with a strong desorbent.

Good fractionating desorbents for use according to the invention include hydrocarbons having 3 to 10 carbon atoms, e. g. propane, butanes, hexanes, decanes, benzene, toluene, xylene, cumene; cyclohexane, cyclohexene, etc. Lower molecular weight hydrocarbons are not preferred in view of the difficulty of liquefying them.

Highly satisfactory strong desorbing agents for use in mixed desorbents according to the invention are organic alcohols, preferably aliphatic alcohols, having 1 to 10 carbon atoms, e. g., methanol, ethanol, n-propanol, isopropanol, butanols, hexanols, decanols, butanediols, pentanediols, hexanediols, decanediols, etc., and organic acids, preferably aliphatic acids, having 1 to 10 carbon atoms, e. g. formic acid, acetic acid, propionic acid, butyric acid, caproic acid, capric acid, benzoic acid, toluic acid, xylic acid, phenylacetic acid, etc. When organic acids are used, they preferably have not more than 3 carbon atoms in view of the odor which the higher molecular weight acids tend to impart to the products if not completely stripped therefrom. Other suitable desorbing agents, which may be used as either fractionating desorbents or as strong desorbents, depending on their adsorption index, are aromatic alcohols, such as benzyl alcohol, phenylethyl alcohol, etc.; chlorinated hydrocarbons, such as trichloroethylene, chloropentanes, chloroform, chlorobenzenes; methylene chloride, propylbromides, tetrachloroethanes, ethylene dichloride, benzyl chloride, chlorobutanes, etc. Various other types of solvents may be employed as desorbent, e. g. pyridine, morpholine, ketones, aldehydes, ethers, etc.

The adsorbent used in the process of the invention may be any suitable inorganic adsorbent, e. g. silica gel, aluminum oxide, activated alumina, bauxite, charcoal, activated charcoal carbon black, Attapulgus clay, Filtrol clay, fuller's earth, infusorial earth, magnesia, ion exchange resins, etc.

Figure 2:
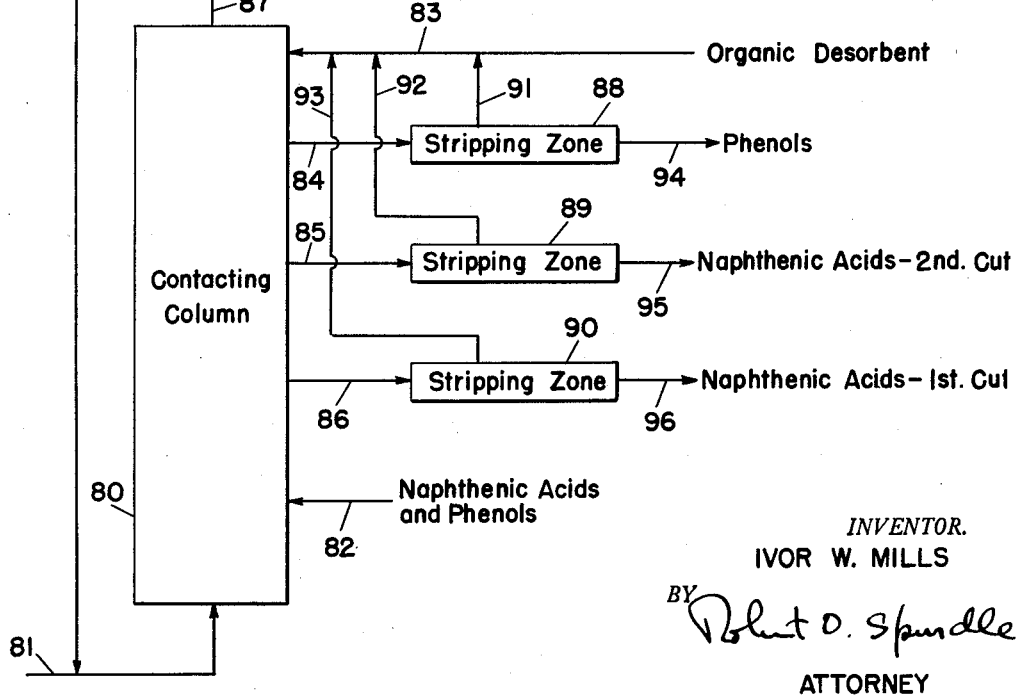

The invention will be more fully described with reference to the attached drawing, wherein Figure 1 is a schematic illustration of the process using a stationary adsorbent bed, and Figure 2 is a schematic illustration of the process with movement of the adsorbent through a plurality of zones in series.

In Figure 1, a vessel 10 is employed in which a compact stationary bed of adsorbent particles, e. g. clay is disposed. The process of the invention is begun by introducing into vessel 10 through line 11 a charge material comprising, for example, a mixture of naphthenic acids, petroleum phenols, and unsaponifiable oil. Such mixture may have been obtained, for example, by recovery of crude naphthenic acids from petroleum in any suitable known manner, the crude naphthenic acids containing residual mineral oil and also containing petroleum phenols. n-petane is suitably used as diluent for this charge material.

The charge material is passed down through the bed at, for example, room temperature, and constituents thereof, including naphthenic acids, become adsorbed on the adsorbent particles. The introduction of charge material is continued until the desired amount has been introduced into the bed. Then introduction of the charge material is discontinued, and introduction of liquid organic desorbent, e. g. a mixture of 10% ethanol and 90% n-petane, through line 12 is begun. The first effluent from the bed is removed through line 16. This effluent comprises pentane and unsaponifiable oil, which has passed through the bed because of its relatively low adsorbability on the adsorbent. The naphthenic acids and phenols in the bed, being more strongly adsorbed, are substantially absent in the first effluent material removed from vessel 10.

As the removal of unsaponifiable oil from the adsorbent bed approaches completion, substantial removal of the less strongly adsorbed naphthenic acids begins to take place. After the desired oil removal through line 16 has been effected, removal of effluent through line 16 is discontinued and removal through line 17 is begun. As the desorption continues, with removal of the less strongly adsorbed naphthenic acids, the more strongly adsorbed naphthenic acids begin to be removed. At any desired point, the effluent path is shifted from line 17 to line 18, later from line 18 to line 19, etc., until the effluent is being removed through line 20, at which time the most strongly adsorbed naphthenic acids are being removed from the adsorbent. As the removal of the naphthenic acids approaches completion, substantial removal of phenols begins to take place, and at the desired point, the effluent path may be shifted from line 20 to line 22. First, the least strongly absorbed phenols are removed, then as the desorption progresses, the more strongly adsorbed phenols. The effluent is shifted periodically from line to line until finally the most strongly adsorbed phenols which can be removed by the desorbent are removed through line 25.

It is to be understood that the naphthenic acids and phenols, and perhaps to some extent the oil and naphthenic acids, will overlap with each other in relative adsorbability, so that the effluent removed through line 20 contains some phenols, and the effluent removed through line 22 contains some naphthenic acids. However, the bulk of the naphthenic acids are quite substantially less strongly adsorbed than the bulk of the phenols.

The various fractions removed through lines 16 to 25 can be recovered free from pentane by distilling the latter to leave the oil, naphthenic acid fraction, or phenol fraction as residue.

When the removal of desorbate through line 25 has been discontinued, the adsorbent in vessel 10 is left substantially free of petroleum charge material, save for residual adsorbed material not removed by the desorbent. Prior to re-introduction of charge material into the adsorbent, it may be necessary to regenerate the adsorbent by means not shown. Any suitable regeneration operation may be employed where necessary, such as treating the adsorbent, with or without added steam, to vaporize the desorbent, or contacting the adsorbent with an auxiliary desorbent having adsorption index, i. e., relative adsorbability, greater than that of the petroleum material, but less than that of the strong desorbent, which auxiliary desorbent is capable of displacing the strong desorbent from the adsorbent, and is in turn capable of being displaced from the adsorbent by the petroleum material.

It is to be noted that according to the present invention, it is possible to use the same material, e. g. pentane, as diluent during the adsorption step and as sole desorbent during the desorption step; such operation provides a more efficient separation than is obtained when using the material as diluent during the adsorption step without subsequently performing a desorption step.

Pentane and other saturated hydrocarbons, when used alone as desorbent, do not provide a rapid desorption, since they have low adsorption indexes. Therefore, it is preferred, when a fractionating desorbent is used as sole desorbent, to use a fractionating desorbent having higher adsorption index, e. g. in the range from 20 to 50.

Turning now to Figure 2: adsorbent material is introduced into column 80 through line 81 and is moved upwardly therein by suitable impelling means such as a screw conveyor not shown. Petroleum material comprising naphthenic acids and petroleum phenols is introduced into column 80 through line 82 and comes in contact with the rising adsorbent. The petroleum material becomes adsorbed on the adsorbent and is carried upwardly thereby into the desorbing zone located between lines 83 and 86. Liquid organic desorbent e. g. benzene, is introduced into an upper portion of the desorbing section through line 83, and flows downwardly countercurrent to the rising adsorbent. A portion of the desorbent is removed from column 80 through line 84, another portion through line 85, and a final portion through line 86 at the lower end of the desorption section. As the adsorbent rises through the desorption section, the petroleum material adsorbed is gradually removed by contact with the desorbent. The less strongly adsorbed naphthenic acids are removed first, in the lowest portion of the desorption section, and are removed with the desorbent through line 86. The more strongly adsorbed naphthenic acids are removed in an intermediate portion of the desorption section and are removed with desorbent through line 85. The phenols are removed in the uppermost portion of the desorption section and are removed with desorbent through line 84. The adsorbent is removed from column 80 through line 87 and returned to the bottom of the column through line 81.

The three desorbent streams removed from column 80 through lines 84, 85, and 86, are stripped in stripping zones 88, 89, and 90 respectively, and desorbent is recycled through lines 91, 92, and 93, respectively. As residue from the respective stripping operations, phenols, more strongly adsorbed acids, and less strongly adsorbed acids are removed through lines 94, 95, and 96, respectively.

The following examples illustrate the invention:

*Example I*

Naphthenic acids having Sap. No. of about 239 mg. of KOH per gram, Acid No. of 228 mg. of KOH per gram, and bromine number (A. S. T. M. 875–46T) of 54.5 were percolated through silica gel and the latter subsequently washed with a desorbent liquid consisting of a mixture of 10% ethanol and 90% n-pentane. The operation was carried out at room temperature, and a plurality of naphthenic acids and phenol fractions were obtained as products.

The naphthenic acids used had been previously obtained by caustic treatment of a 450° F. endpoint petroleum naphtha followed by acidification of the caustic sludge and recovery of the naphthenic acids containing about 25% oil. These acids were dissolved in n-pentane and percolated through silica gel and followed immediately by the desorbent, which selectively desorbed some of the relatively less strongly adsorbed constituents which has been adsorbed from the charge onto the gel. Separate fractions of the effluent were recovered; pentane was removed from each fraction by stripping.

The approximate weight percents and refractive indices of the fractions obtained are given below in chronological order of their recovery; some material undoubtedly remained adsorbed on the adsorbent, but the amount was small and is not taken into account in the following table:

| Fraction | Weight Percent | Refractive Index at 20°C. |
| --- | --- | --- |
| 1 | 5 | 1.4535 |
| 2 | 10 | 1.464 |
| 3 | 11 | 1.460 |
| 4 | 8 | 1.4585 |
| 5 | 17 | 1.460 |
| 6 | 9 | 1.4655 |
| 7 | 8 | 1.484 |
| 8 | 7 | 1.489 |
| 9 | 10 | 1.519 |
| 10 | 15 | 1.492 |
|  | 100 |  |

Fraction 1 is largely oil. Fractions 2 to 6 inclusive may be considered naphthenic acids fractions and fractions 7 to 10 inclusive may be considered phenol fractions, though there is probably some phenol contained in some of the naphthenic acids fractions and vice versa.

Fractions 2 to 6 inclusive were combined into a composite naphthenic acids product, and fractions 7 to 10 inclusive into a composite phenol fraction. The following table shows the properties of these composite products as compared with the charge material.

|  | Charge | Naphthenic Acids | Phenols |
| --- | --- | --- | --- |
| Acid No. | 228 | 308 | 154 |
| Bromine No. | 54.5 | 11.7 | 125 |
| Weight Percent Yield |  | 55 | 40 |

The considerably reduced bromine number of the naphthenic acids indicate that a rather sharp separation from phenols has been obtained.

It is noted that only 5% of the charge was recovered in fraction 1, the oil fraction, whereas the charge contained about 25% oil. The remainder of the oil is therefore indicated to have a greater tendency to be adsorbed on the gel, and to be incorporated in the later fractions, probably the phenol fractions; these more highly adsorbed constituents of the oil are probably aromatic compounds.

This example shows that a rather sharp separation between naphtha naphthenic acids and phenols contained therein can be effected by passage through silica gel with subsequent treatment of the gel with a mixture of ethanol and pentane, and that various naphthenic acids fractions having different properties and also various phenol fractions having different properties can be recovered as products of the process.

It is to be noted that the term, phenols, as used above, refers to fractions having markedly higher refractive index and bromine number than the naphthenic acid fractions obtained. These "phenol" fractions may include carboxylic acids having relatively high refractive index, perhaps because of aromatic rings in the molecule, as well as hydroxy-aromatic compounds.

*Example II*

Deoiled lubricating oil naphthenic acids having Sap. No. of 170 mg. KOH per gram and bromine number of 9.8 were treated in a manner generally similar to that employed in Example I except that fuller's earth was used as adsorbent instead of silica gel and a mixture of 5% acetic acid and 95% n-pentane was employed as desorbent in place of the mixture of ethanol and pentane. A mixture of 50% acetic acid and 50% n-pentane was used toward the end of the desorption. A plurality of naphthenic acids and phenol fractions were recovered. The approximate weight percents (based on the charge) and properties of the fractions are given below in chronological order of the recovery thereof:

| Fraction | Weight Percent | Refractive Index | Bromine No. |
|---|---|---|---|
| 1 | 2.5 | 1.463 | 2.0 |
| 2 | 25.5 | 1.487 | 5.0 |
| 3 | 32.5 | 1.496 | 5.5 |
| 4 | 21.5 | 1.504 | 8.0 |
| 5 | 10.0 | 1.514 | 12.5 |
| 6 | 3.5 | 1.550 | 52 |
| 7 | 2.5 |  | 34 |
|  | 98.0 |  |  |

Fractions 2 to 5 inclusive may be considered to be naphthenic acids fractions, and fractions 5 to 7 inclusive may be considered to be phenol fractions. The abrupt increases in refractive index and bromine number between fractions 5 and 6 indicate that a rather sharp separation of naphthenic acids from phenols is effected in those fractions. Fraction 1 is probably mainly residual oil left after the previous deoiling of the charge. About 2% of the charge remained adsorbed on the clay.

This example shows that a rather sharp separation between lubricating oil naphthenic acids and phenols contained therein can be effected by passage of the naphthenic acids through clay with subsequent treatment of the clay with a solution of acetic acid in pentane, and that various naphthenic acids and phenol fractions having different properties can be recovered as products of the process.

The invention claimed is:

1. Method for separating petroleum naphthenic acids into a plurality of fractions which comprises: contacting a petroleum naphthenic acids charge material with an inorganic solid adsorbent, thereby to adsorb naphthenic acids on said adsorbent; contacting said adsorbent with an organic solvent desorbing agent having an adsorption index within the approximate range from 0 to 50, thereby to obtain a first desorbate fraction containing relatively less strongly adsorbed naphthenic acids constituents of said charge material; and further contacting said adsorbent with an organic solvent desorbing agent having adsorption index within said range, thereby to obtain at least one additional, separate desorbate fraction containing relatively more strongly adsorbed constituents of said charge material.

2. Method according to claim 1 wherein said desorbing agent comprises an aliphatic hydrocarbon having 3 to 10 carbon atoms.

3. Method according to claim 1 wherein said desorbing agent comprises an aromatic hydrocarbon.

4. Method according to claim 1 wherein said desorbing agent comprises a strong desorbent having adsorption index above 50 and a fractionating desorbent having adsorption index within the range from 0 to 50.

5. Method according to claim 1 wherein said desorbing agent comprises as strong desorbent an aliphatic alcohol having 1 to 10 carbon atoms and as fractionating desorbent an aliphatic hydrocarbon having 3 to 10 carbon atoms.

6. Method according to claim 1 wherein said desorbing agent comprises as strong desorbent a fatty acid having 1 to 10 carbon atoms and as fractionating desorbent an aliphatic hydrocarbon having 3 to 10 carbon atoms.

7. Method for separating naphthenic acids from petroleum phenols which comprises: contacting naphthenic acids containing petroleum phenols with an inorganic solid adsorbent, thereby to adsorb naphthenic acids and phenols on said adsorbent; contacting said adsorbent with an organic solvent desorbing agent having an adsorption index within the approximate range from 0 to 50, thereby to obtain a first desorbate fraction containing naphthenic acids; and further contacting said adsorbent with an additional portion of said organic solvent desorbing agent, thereby to obtain at least one additional, separate desorbate fraction, at least one of which additional desorbate fractions contains petroleum phenols.

8. Method for separating naphthenic acids into a plurality of naphthenic acids fractions which comprises: contacting naphthenic acids with an inorganic solid adsorbent, thereby to adsorb naphthenic acids on said adsorbent; contacting said absorbent with an organic solvent desorbing agent having an adsorption index within the approximate range from 0 to 50, thereby to obtain a first desorbate fraction containing relatively less strongly adsorbed naphthenic acids; and further contacting said adsorbent with an additional portion of said organic solvent desorbing agent, thereby to obtain at least one additional, separate desorbate fraction containing relatively more strongly adsorbed naphthenic acids.

References Cited in the file of this patent

UNITED STATES PATENTS

| 2,331,244 | Strickland | Oct. 5, 1943 |
| 2,585,490 | Olsen | Feb. 12, 1952 |